United States Patent [19]

Sheth et al.

[11] Patent Number: 5,468,259

[45] Date of Patent: Nov. 21, 1995

[54] DYEABLE POLYOLEFIN COMPOSITIONS AND DYEING POLYOLEFIN COMPOSITIONS

[76] Inventors: Paresh J. Sheth, 3102 Deer Creek, Sugarland, Tex. 77478; Roger R. Kolm, 66 N. Turtle Rock Ct., The Woodlands, Tex. 77380

[21] Appl. No.: 154,682

[22] Filed: Nov. 18, 1993

Related U.S. Application Data

[63] Continuation-in-part of Ser. No. 987,010, Dec. 1, 1992, abandoned.

[51] Int. Cl.$^6$ .................. D06P 3/79; D01F 6/46; D01F 6/52; C08L 23/12
[52] U.S. Cl. .................. 8/497; 8/928; 525/179; 525/194; 525/227
[58] Field of Search ................... 525/179, 194, 525/227; 8/497, 928

[56] References Cited

U.S. PATENT DOCUMENTS

| | | |
|---|---|---|
| 3,156,743 | 11/1964 | Coover, et al. . |
| 3,361,843 | 1/1968 | Miller et al. . |
| 3,373,222 | 3/1968 | Armstrong . |
| 3,373,223 | 3/1968 | Armstrong . |
| 3,373,224 | 3/1968 | Mesrobian et al. . |
| 3,395,198 | 7/1968 | Taniguchi et al. . |
| 3,433,573 | 3/1969 | Holladay ................ 525/240 |
| 3,433,853 | 3/1969 | Earle et al. . |
| 3,454,512 | 7/1969 | Ahmed et al. . |
| 3,653,803 | 4/1972 | Hammer . |
| 3,879,492 | 4/1975 | Bontinick . |
| 4,035,438 | 7/1977 | Nielinger . |
| 4,078,014 | 3/1978 | Starkweather, Jr. et al. . |
| 4,174,358 | 11/1979 | Epstein ................ 525/183 |
| 4,234,656 | 11/1980 | Amembal ................ 525/194 |
| 4,368,295 | 1/1983 | Newton, et al. ................ 525/166 |
| 4,377,616 | 3/1983 | Ashcraft et al. ................ 428/327 |
| 4,510,743 | 4/1985 | de Kroon ................ 52/260 |
| 4,557,958 | 12/1985 | Barkis et al. ................ 428/36 |
| 4,615,941 | 10/1986 | Lu ................ 428/327 |
| 4,780,505 | 10/1988 | Mashita et al. ................ 525/66 |
| 4,782,110 | 11/1988 | Wolfe, Jr. ................ 525/227 |
| 4,853,290 | 8/1989 | Yanidis ................ 428/516 |
| 4,988,764 | 1/1991 | Nishio et al. ................ 525/66 |
| 5,006,601 | 4/1991 | Lutz et al. ................ 525/66 |
| 5,017,658 | 5/1991 | Noma et al. ................ 525/195 |
| 5,147,931 | 9/1992 | Sakuma et al. ................ 525/66 |
| 5,162,422 | 11/1992 | Lausberg et al. ................ 525/66 |
| 5,179,164 | 1/1993 | Lausberg et al. ................ 525/179 |
| 5,234,993 | 8/1993 | Huynh-Ba ................ 525/66 |
| 5,237,003 | 8/1993 | Otawa et al. ................ 525/66 |
| 5,238,990 | 8/1993 | Yu et al. ................ 525/66 |

FOREIGN PATENT DOCUMENTS

| | | |
|---|---|---|
| 0000783A3 | 8/1978 | European Pat. Off. . |
| 783 | 2/1979 | European Pat. Off. ................ 525/227 |
| 902809 | 8/1962 | United Kingdom . |
| 902809 | 8/1962 | United Kingdom ................ 525/227 |
| 998439 | 7/1965 | United Kingdom . |
| 2141719 | 1/1985 | United Kingdom ................ 525/227 |
| 2141719 | 1/1995 | United Kingdom . |
| WO85/05216 | 11/1985 | WIPO . |
| 05216 | 11/1985 | WIPO ................ 525/227 |

OTHER PUBLICATIONS

*A Focus on Polypropylene Fibers in Upholstery;* Paper presented by Floyd Hill Amoco Fabrics & Fibers, Nov. 3–4, 1993.

*Primary Examiner*—David Buttner
*Attorney, Agent, or Firm*—Browning, Bushman, Anderson & Brookhart

[57] ABSTRACT

Disperse dyeable compositions of ethylene alkylacrylate grafted onto polyolefin (isotactic polypropylene) are provided. A process for disperse dyeing polyolefin (isotactic polypropylene) shaped into articles such as fibers is provided. This process comprises (1) extruding the polyolefin with about 2 to 30 percent by weight of a thermoplastic copolymer of ethylene and alkylacrylates having one or four carbons in the alkyl group into fibers, and (2) exposing the fibers to a disperse dye bath containing a disperse dye.

33 Claims, No Drawings

DYEABLE POLYOLEFIN COMPOSITIONS AND DYEING POLYOLEFIN COMPOSITIONS

This is a continuation in part of Ser. No. 07/987,010, filed Dec. 07, 1992, now abandoned.

FIELD OF THE INVENTION

This invention relates to novel dyeable polyolefin compositions, more particularly, to novel disperse dyeable polyolefin articles, especially fibers, and to processes for disperse dyeing such articles.

BACKGROUND OF THE INVENTION

Polyolefins are hydrophobic and difficult to dye in that they lack dye sites to which dye molecules may become attached. One approach to color polyolefin fibers has been to add colored inorganic salts or stable organometallic pigments to polymer melts prior to fiber spinning. Nonvolatile acids or bases or materials such as polyethylene oxides or metal salts have been added to polymers prior to fiber formation to increase the affinity of the fiber for disperse, cationic, acid or mordant dyes. Polyolefin fibers are said to be grafted chemically with appropriate monomers after fiber formation to improve dyeability. *Textile Fibers, Dyes, Finishes, and Processes: A Concise Guide*, by Howard L. Needles, Noyes Publications, 1986, p. 191. An example of efforts to impart dyeability to polyolefins, and particularly polypropylene, has been nitrogen-based polymer additives. For example, in U.S. Pat. No. 3,361,843 issued to Robert Miller and Frederick C. Loveless on Jan. 2, 1968, various incompatible, basic nitrogen-based polymers are added to polypropylene, given a treatment with high concentrations of certain acidic chemical reagents and then dyed in an acid dye bath. U.S. Pat. No. 3,433,853 issued to Ralph H. Earle, Alfred C. Schmalz and Charles A. Soucek on Mar. 18, 1969 is similar. According to U.S. Pat. 3,653,803, issued to Clarence F. Hammer on Apr. 4, 1972, and assigned to a common assignee of U.S. Pat. No. 3,433,853, dyeing of the polypropylene fiber is somewhat improved by the method of U.S. Pat. No. 3,361,843, but processing of the fiber is difficult due to the incompatible polymer, the dye fastness properties are not reliably reproducible, and tinctorial strengths are not commercially sufficient. In U.S. Pat. No. 3,395,198 issued to Isaji Taniguchi et al. on Jul. 30, 1968, and U.S. Pat. No. 3,653,803, various compatible nitrogen-containing copolymers of ethylene and an aminoalkyl acrylate compound are disclosed which, when blended with polyolefins, render fibers formed from the blend acid dyeable. In U.S. Pat. No. 3,653,803, the compatible nitrogen-containing polymers are as disclosed in U.S. Pat. No. 3,395,198. In U.S. Pat. No. 5,017,658, issued to Takeshi Noma on May 21, 1991, a fiber finishing agent is used in melt spinning dyeable polypropylene fibers obtained by blending a copolymer of an ethylene aminoalkyl acrylate with polypropylene.

In U.S. Pat. No. 4,557,958, issued Dec. 10, 1985 to Edward D. Barkis, et al on Dec. 10, 1985, a blend of 70 weight percent polypropylene homopolymer and 30 weight percent ethylene-methylacrylate copolymer is applied to a fabric of woven polyolfin as a coating stripe to prevent fraying of the fabric when the fabric is cut.

In U.S. Pat. No. 4,853,290, issued to Apostol Yanidis on Aug. 1, 1989, a blend of ethylene-acrylic acid copolymer and ethylene-methylacrylate copolymer is coextruded onto a polypropylene film to serve as an adhesive or tie layer to a second polymer applied to it.

In U.S. Pat. No. 4,782,110, issued to James R. Wolfe, Jr. on Nov. 1, 1988, melt processible multi-phase thermoplastic compositions are described which can be formed into various shapes by compression molding, injection molding, blow molding and extrusion, and said to be useful for automotive parts, e.g. automotive boots, seals, gaskets, tubing, reinforced hose, film and sheeting. The composition comprises a blend of (a) 15–75 parts by weight of a crystalline polyolefin resin forming the continuous phase of the composition, and (b) 25–85 parts by weight of a crosslinked elastomer of an ethylene alkyl acrylate copolymer consisting essentially of units derived from ethylene, an alkyl ester of acrylic acid wherein the alkyl group contains 1–6 carbon atoms, and a monoalkyl ester of 1,4-butenedioic acid wherein the alkyl group contains 1–6 carbon atoms, forming the discontinuous phase of the composition.

SUMMARY OF THE INVENTION

According to the present invention, there are provided novel compositions and articles of polyolefins that are dyeable with disperse dyes, novel methods of disperse dyeing polyolefin articles, and novel shaped dyed articles, including novel dyed polypropylene fiber, produced by such processes.

A novel polyolefin fiber comprises about 98 to 85 percent by weight of a polypropylene and a selected amount of an ethylene copolymer comprising about 70 to 80 percent by weight ethylene and about 30 to 18 percent by weight of a alkyl acrylate wherein the alkyl has one to four carbon atoms, said composition containing 0.2% –2.0% alkyl acrylate by weight the sum of the polypropylene and ethylene copolymer, wherein at least a portion of said copolymer is grafted onto said polyolefin, and an effective amount of a disperse dye diffused into the polypropylene to produce a colored fiber.

A novel polyolefin fiber comprises about 98 to 85 percent by weight of a polyolefin and a selected amount of an ethylene copolymer incorporated into the polypropylene to form an alloy, said ethylene copolymer comprising about 70 to 80 percent by weight ethylene and about 30 to 18 percent by weight of a alkyl acrylate wherein the alkyl has one to four carbon atoms, said alkyl acrylate present in an amount 0.2–2.0% by weight; and an effective amount of a disperse dye diffused into the polypropylene to produce a colored fiber.

A novel process for dyeing shaped articles based on a polyolefin comprises (a) forming into a fiber a composition of about 98 to 85 percent by weight of a polyolefin and a selected amount of an ethylene copolymer comprising about 70 to 80 percent by weight ethylene and about 30 to 18 percent by weight of a alkyl acrylate wherein the alkyl has one to four carbon atoms; and (b) exposing the fiber to a disperse dye.

A novel process for dyeing fibers based on polypropylene comprises (a) combining isotactic polypropylene with a selected amount of an ethylene copolymer of about 70 to 80 percent by weight ethylene and about 30 to 18 percent by weight of an ethylene alkyl acrylate wherein the alkyl group has one to four carbon atoms, to form a composition, said composition having an alkyl acrylate component of about 0.2–2.0% by weight of the total polymer content; (b) extruding the composition into fibers; and (c) exposing the fibers to a disperse dye bath containing an disperse dye.

The polyolefin in these compositions and processes preferably is isotactic polypropylene. In the processes, the composition may be a blend or one in which at least a portion of the ethylene copolymer is grafted onto said polyolefin.

The ethylene copolymer in the compositions include ethylene methyl acrylate, ethylene ethyl acrylate, and ethylene butyl acrylate.

DETAILED DESCRIPTION OF THE INVENTION

Polyolefins useable in accordance with this process are crystalline polyethylene, polypropylene, or copolymers thereof, having melt indices in the range from about 0.07 to about 80 dg/min. The most important polyolefin for use in formation of fibers at this time is isotactic polypropylene, which is rendered dyeable by the process of the present invention, and is commercially available from many sources. The polypropylene can contain the usual thermal, oxidative and ultraviolet light stabilizers.

Polyolefins are not dyeable by acid dyes since they lack basic sites with which the dye may form a complex of low solubility. Polypropylene is rendered dyeable by uniformly blending it into a polypropylene composition with 2 to 30 percent by weight, suitably 2 to 15 percent, preferably 4 to 10 percent, most preferably about 7 percent, of a copolymer of ethylene and an alkyl acrylate. Alternatively, and in accordance with this invention, the copolymer of ethylene and an alkyl acrylate is grafted onto the polypropylene, and the composition may include both grafted and blended ethylene alkyl acrylate copolymer. The carboxyl of the ester group of the ethylene alkyl acrylate copolymer is believed to provide sites which will form hydrogen bonding complexes with disperse dyes. An advantage of the ethylene alkyl acrylate copolymer is that it is both thermoplastic and compatible with polypropylene so that processing difficulties are minimized or prevented. By the term compatible is meant that the copolymer does not separate into discrete particles in the polypropylene composition which are observable under an optical microscope at a magnification of times 250 to 500.

The ethylene copolymer comprising ethylene and an alkyl acrylate in the compositions used in this invention include ethylene methyl acrylate, ethylene ethyl acrylate, and ethylene butyl acrylate. Ethylene methyl acrylate copolymer ("EMA") alone or in blends has been used in film, extrusion coating, sheet, molding, tubing, profile extrusion and coextrusion areas. Compared to low density polyethylene homopolymer, it has a lower softening temperature (138° F.), a reduced flexural modulus, and improved environmental stress crack resistence. It is thermally stable and can be processed at extrusion coating temperatures of 600° F. to 630° F. It is said to have been used as a blending component with low density polyethylene, polypropylene, polyester, and polycarbonate to improve impact strength and toughness, to increase heat seal response and promote adhesion, to reduce stiffness, and to increase the surface coefficient of friction. *Modern Plastics*, Mid-October Encyclopedia Issue, 1991, pp. 71–72.

Ethylene ethyl acrylate copolymer ("EEA") resins are tough, flexible copolymers that have found application in profile extrusion specialty hose and tubing applications, gasketing, and bumpers; film applications include disposable examination gloves for doctors and dentists, ballons, etc. EEA has been used for hot melt adhesives. As the ethylacrylate content of EEA increases, the copolymers become more flexible, tougher, and more resilient. The polarity of high ethylacrylate resins is said to enhance surface acceptance of inks and provide adhesive properties. *Modern Plastics*, Mid-October Encyclopedia Issue, 1991, pp. 71–72.

Ethylene butyl acrylate ("EBA") is used for low melt-index films. It produces a tough film at low temperatures and is employed mainly in the packaging of frozen foods. *Modern Plastics*, Mid-October Encyclopedia Issue, 1991, pp. 68.

Particularly preferred copolymers are the ethylene methyl acrylate random copolymers of ethylene and methylacrylate and the ethylene ethyl acrylate random copolymers of ethylene and ethylacrylate. The EMA copolymers preferably contain about 20 to 24 percent by weight of methylacrylate. The EEA copolymers preferably contain about 15 to 30 percent by weight of the ethylacrylate moiety. These copolymers have a melt index of 1 to 20, preferably from 2 to 4; and have a thermal stability such that when the temperature is raised at 10° C./min., under flowing nitrogen, less than 0.75 percent of the copolymer weight is lost at 300° C.

It is a critical feature of the present invention that the amount of alkyl acrylate in the polypropylene ethylene alkyl acrylate copolymer be present in an amount between 0.2% to 2.0% by Weight in order to produce a textile fiber having commercially acceptable processing characteristics. If the amount of alkyl acrylate component is increased above 2.0%, a textile fiber produced therefrom loses its necessary polypropylene characteristics, degrades during high-speed fiber processing and produces a final fiber with unacceptably low tenacity (less than about 1.5 grams/denier) and excessive elongation and with significantly different melt characteristics to be commercially unacceptable. For example, carpet made from fibers having an alkyl acrylate component between 2.0% and 2.2%, melts excessively upon exposure to flame as compared to conventional polypropylene carpet to the point that it dramatically fails a standard "pill test" for flame resistance while standard polypropylene passes. Further, at an alkyl acrylate content above 2.0% the fiber fuses together on the heated drawing rolls and is basically unspinnable on modern commercial scale equipment. These subtle, yet commercially critical, limitations were completely unexpected.

A alkyl acrylate component of less than 0.2% produces a fiber with insufficient dye performance character to accept a desired even deep color. Accordingly, the maximum amount of alkyl acrylate component is preferred subject to acceptable fiber production and performance character. The more preferred alkyl acrylate component is between 0.5%–1.7% by weight, with 1.0–1.5% being most preferred.

It is understood that polymer additives, such as thermal, oxidative and ultraviolet light stabilizers, which are typically found in fiber-forming polymer compositions may be added without departing from the present invention. The percent by weight values given herein are expressed as a percent by weight of the sum of the polypropylene and alkyl acrylate copolymer. If such additives are included in the composition to dilute the polymer composition, the percent values must be adjusted accordingly.

As discussed, the ethylene copolymers utilized in the present invention contain at least 70% ethylene with the alkyl acrylate component present between 15–30%, typically between 18–24% depending upon the selected alkyl acrylate. Depending upon the amount of alkyl acrylate component present in the ethylene copolymer, the ratio of ethylene copolymer to polypropylene can be easily adjusted to maintain the proper amount of alkyl acrylate in the final product. It is also important that the amount of ethylene contributed by the ethylene copolymer be maintained below 10%. Accordingly, it is preferred that the higher the percentage of alkyl acrylate in the copolymer, the easier it is to obtain the proper balance of components. By way of example, a mixture of 93% polypropylene and 7% ethylene methyl acrylate having a 20% methyl acrylate component produces a polypropylene/ethylene methyl acrylate copolymer composition having a methyl acrylate component of about 1.4%. Similarly, a 3% addition of the same ethylene methyl acrylate copolymer produces a methyl acrylate component of 0.6%.

It has been found very desirable in some applications to blend a minor amount (1– 10%, preferably 2–5%) of a polyamide such as nylon 6 into the composition to further enhance the composition without sacrificing the desired spinning or dyeing properties of the fiber. The addition of this small amount of polyamide improves flammability, improves tenacity and improves resiliency even to a point that the modified fiber is more resilient than polypropylene alone. When a nylon component is added it may substitute for a part of the ethylene copolymer as long as the alkyl acrylate component doesn't drop below an amount sufficient to keep the otherwise immiscible polypropylene and polyamide from separating (usually about 0.5%). A preferred composition when polyamide is included is about 0.9% alkyl acrylate component (approximately 4% ethylene copolymer) and 3% nylon 6 with the remainder (approximately 93%) polypropylene.

In using a composition of the polypropylene and ethylene-alkylacrylate copolymer in carrying out the dyeing procedure of this invention, it is important that the polypropylene and ethylene-alkylacrylate copolymer be uniformly incorporated prior to forming the composition into a shaped article. The combination may be only a uniform blend, but preferably, and in accordance with this invention, it is a composition in which at least a portion of the ethylene alkyl acrylate is grafted onto the polypropylene. Whether by [B lending. Blending and/or grafting can be accomplished in a separate step prior to forming, or the blending and/or grafting and extrusion can be carried out in the same operation if the extruder has a suitable mixing section. Poor blending and/or grafting can result in uneven dyeing even if the remaining steps of dyeing procedure are properly conducted.

The grafting of ethylene alkyl acrylate copolymer to polyolefin polymer, preferably isotactic polypropylene, for use in this invention is accomplished by subjecting the ethylene alkyl acrylate copolymer to co-graft polymerization in the presence of the polyolefin polymer. A combination of 98 to 70% by weight of polyolefin and 2 to 30% by weight of ethylene alkyl copolymer is suitable, and a combination of about 96 to about 90% polypropylene and 4 to about 10% ethylene alkyl copolymer is particularly preferred.

The graft polymerization method is not critical and the graft polymerization can be effected according to conventional methods employing organic free radical initiators. The polymerization conditions may be those known to the art. The organic radical-generating agent used in this invention includes:
2,5-dimethyl-2,5-di(t-butylperoxy)hexyne-3,
2,5-dimethyl-2,5-di(t-butylperoxy)hexane,
1,3-bis(t-butylperoxyisopropyl)benzene,
2,2-bis(t-butylperoxy)-p-diisopropylbenzene,
dicumyl peroxide,
di-t-butyl peroxide,t-butyl benzoate,
1,1-bis(t-butylperoxy)-3,3,5-trimethylcyclohexane,
2,4-dichlorobenzoyl peroxide,
benzoyl peroxide,
azobisisobutyronitrile and the like.
Preferred are:
2,5-dimethyl-2,5-di(t-butylperoxy)hexane,
1,3-bis(t-butylperoxyisopropyl)benzene and
2,2-bis-(t-butylperoxy)-p-diisopropylbenzene.

The thermoplastic resin composition of this invention can be obtained by adding 0.01 to 0.3 parts by weight, preferably 0.05 to 0.2 parts by weight, of an organic radical-generating agent to 100 parts by weight of a mixture consisting of 98 to 70% by weight, preferably 96 to 90% by weight of polypropylene and 2 to 30% by weight, preferably 4 to 10% by weight of an ethylene alkyl acrylate copolymer, and then subjecting the resulting mixture to thermal treatment in a mixer (e.g., a Banbury mixer, a kneader) or an extruder at 170° to 300° C., preferably 180° to 250° C., for 0.2 to 30 minutes, preferably 0.5 to 20 minutes.

The uniform combination of polypropylene and ethylene-alkyl acrylate copolymer is formed into the desired shaped article by any of the known techniques such as melt spinning in the case of fibers, casting or other known methods of film-making, extrusion or injection molding. The present invention is particularly useful with fibers and fibers of various deniers can be adequately dyed with good dye utilization. When a degree of orientation is increased, at a given melt flow rate, for example, by a times 3 compared to a times 1.5 draw ratio, a significant increase in uptake of the dyestuff is observed. An increased degree of orientation is the result of the degree of higher draw ratios. Generally, the fibers are from 1 to 1500 denier and can be in the form of round or lobed fibers, tape or fibrillated film. Round or lobed fibers are for apparel, upholstery and carpet face yarn uses and can have a denier of about 1 to 60 without encountering dyeing problems by the present technique. These fibers can also be used in production of other articles, such as decorated ribbons or non-woven textiles. The tape fibers are generally used for carpet backing and are of heavier denier, i.e., about 500 to 1500 denier. Fibrillated film fibers are used for cordage, carpet face yarn or upholstery.

For fibers to be fully penetrated by dye, the spinning and drawing processes should be conducted in a manner to produce a fiber with a uniform structure through its cross-section i.e., minimal sheath/core structural differences. On the other hand, greater economy of dye use in dyeable carpet backing made from woven tapes can be obtained if such tapes do possess a sheath/core structure. In these sheath/core structures, the sheath is dyeable, while the core exhibits very little dye pick-up. Thus, less dye is used to dye a backing which is made up from such fibers.

After spinning of the fibers, but before drawing, a spin finish can be applied to the fibers. If such a material is used, it may be anionic, but preferably is non-ionic in nature. Non-ionic spin finishes are commercially available and a preferred one is "Dispersol VL". Suitably useable is "Nopcostat" 2152P, which is thought to be a modified coconut fatty acid ester. Finishes containing mineral oil act as a plasticizer and can increase dye uptake rate at the fiber surface. A water-dispersible or water-soluble finish such as the "Dispersol VL" is preferred.

Finishing operations can optionally be performed on the fibers before dyeing. For example, the fibers can be texturized by mechanically crimping or forming such as described in *Textile Fibers, Dyes, Finishes, and Processes: A Concise Guide*, by Howard L. Needles, Noyes Publications, 1986, p. 17–20.

The fibers are then dyed in a disperse dye bath generally between pH 2 and pH 6, suitably between pH 4 and pH 6, using conventional disperse dyes and disperse dyeing techniques. Disperse dyes are sparingly soluble in water, and the aid of a surfactant to disperse the dye in the dyebath is preferable. When dyeing additive-modified polyolefin alone in the dyebath, the surfactant can be omitted. For best results and for good dye penetration, a non-ionic surfactant (0.1 to 100 parts per million of dyeliquor) can be optionally employed.

Physical factors such as temperature and agitation and auxiliary chemicals added to the dyebath can alter the rate of dyeing and/or the total dye absorbed by the fiber. Agitation of the dyebath speeds dye diffusion to the fiber in the dyebath. The rate of dye passage across the fiber-liquid interface is rapid in most cases, so the rate of dyeing is essentially determined by the rate of dye movement within the fiber matrix. Elevated temperatures increase diffusion into the fiber, but decreases the total dye exhausted on the fabric.

As known in the art, see *Needles*, supra, at page 184, various specialized techniques have been developed for application of disperse dyes. Heretofore these applications essentially have been directed to polyester fibers. Unless the dyeing is carded out at 100° C. or above, the rate of dyeing is slow. Dyeing with disperse dyes from aqueous solutions at 120°–130° C. to achieve rapid dyeings requires the use of closed high-pressure equipment. Jet dyeing has been introduced which permits high-temperature dyeing and impingement of the dye onto the moving fabric through use of a venturi jet system. Carders permit faster dyeing at atmospheric pressure and below 100° C. Carriers are usually organic compounds that can be emulsified in water and which have affinity for the fiber polymer. The carriers penetrate the polymer, often swelling the fiber, and aid passage of the disperse dye across the dye solution fiber interface into the fiber. Suitable carriers include aromatic hydrocarbons such as diphenyl and methylnaphthalene, phenolics such as o- and p-phenylphenol, halogenated aromatics such as the di- and trichlorobenzenes, aromatic esters including methyl salicylate, butyl benzoate, and diethylphthalate, and benzaldehydes. Carriers must be removed after dyeing.

Continuous dyeing is carried out on a dyeing range where fabric or carpet is continuously passed through a dye solution of sufficient length to achieve initial dye penetration. Some disperse dyes may be sublimated under heat and partial vacuum into polymer fiber, by methods known in the art. Printing of polyolefin compositions made in accordance with our invention can be accomplished with disperse dyes by heat transfer printing under pressure with sufficient heating to cause diffusion of disperse dyes into the polyolefin. Block, flat screen, and heat transfer batch processes, and engraved roller and rotary screen printing continuous processes may be used. Different dye solutions may be jet sprayed in programmed sequence onto fabric or carpet made of the compositions of this invention as the fabric passes under the jets to form patterns. Dye solution may be metered and broken or cut into a pattern of drops which are allowed to drop on a dyed carpet passing underneath to give a diffuse overdyed pattern on the carpet. Competitive dyeing of polyolefins is useful when dyeing styled carpets consisting of several different fibers such as nylon, polyester, etc. and a polyolefin. Different styling effects can be produced by controlling shade depth on each type of fiber present. Acid, disperse and premetallized dyes or combinations thereof, depending upon the fibers present, can be employed to obtain styling effects. Also, styling effects obtained from a fiber combination can be achieved by making a fabric or carpet face from polyolefin yarns containing varying amounts of ethylene alkylacrylate copolymer. Just as tweed effects can be produced in a nylon carpet by tufting with nylon fibers containing different levels of amine ends, so too can these styled, tweed effects be produced in a polyolefin fiber by controlling the concentration of ethylene alkylacrylate dye sites. Print dyeing, space dyeing, and continuous dyeing can be carded out with fabrics made from such yarns.

Any of the disperse dyes known to those skilled in the art can be used in the dispersed dye bath. There are many such dyes commercially available. Dyes are classified based on method of application and to a lesser extent on chemical constitution by the Society of Dyers and Colorists. Various disperse dyes useful in accordance with this invention may be found in the listing "Dyes and Pigments by Color Index and Generic Names" set forth in *Textile Chemist and Colorist*, July 1992, Vol. 24, No. 7, a publication of the American Association of Textile Chemists and Colorists.

The invention can be further understood by referring to the following examples in which parts and percentages are by weight unless otherwise indicated.

EXAMPLE 1

A polypropylene alloy composition containing 93 percent by weight of a commercial fiber grade of isotactic polypropylene having a melt flow rate of 18 (ASTM D-1238-89, 230° C., 2.16 lbs) and containing thermal, oxidative and ultraviolet light stabilizers and 7 percent by weight of a copolymer of ethylene methylacrylate is prepared by first dry mixing the polymers and then melt blending the mix in a 40 mm Berstorff extruder at 246.° C. The ethylene copolymer contains 20 percent by weight of the methylacrylate comonomer, and has a melt flow rate of 18 (ASTM D-1238-89, 190 ° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubular-knit fabric. Samples of the fabric are dyed according to the procedure given below. Results are shown in Table II.

EXAMPLE 2

A polypropylene graft composition containing 93 percent by weight of a commercial fiber grade of isotactic polypropylene having a melt flow rate of 4 (ASTM D-1238-89, 230° C., 2.16 lbs) and 7 percent by weight of a grafted copolymer of ethylene methylacrylate (and containing thermal, oxidative and ultraviolet light stabilizers) is prepared by first dry mixing the polymers and then melt blending the mix in a 40 mm Berstorff extruder at 246° C. in the presence of sufficient free radical initiator peroxide, specifically, 2,5-dimethyl-2,5-di(tertiary-butyl peroxy)hexane, to visbreak the composition to a product melt flow rate of 18. The ethylene copolymer contains 20 percent by weight of the methylacrylate comonomer, and has a melt flow rate of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubular-knit fabric. Samples of the fabric are dyed according to the procedure given below. Results are shown in Table II.

EXAMPLE 3

A polypropylene combination alloy and graft composition containing 93 percent by weight of a commercial fiber grade of isotactic polypropylene having a melt flow rate in the range of 8–12 (ASTM D-1238-89, 230° C., 2.16 lbs) (and containing thermal, oxidative and ultraviolet light stabilizers) and 7 percent by weight of a alloyed and grafted copolymer of ethylene methylacrylate is prepared by first dry mixing the polymers and then melt blending the mix in a 40 mm Berstorff extruder at 246° C. in the presence of sufficient free radical initiator peroxide, specifically 2,5-dimethyl-2,5-di(tertiary-butyl peroxy)hexane, to visbreak the composition to a product melt flow rate of 18. The ethylene copolymer contains 20 percent by weight of the methylacrylate comonomer, and has a melt flow rate of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are about the same as those obtained with the fibers of Example 2. Specimens of the fibers are knitted on a knitting machine to produce a tubular-knit fabric. Samples of the fabric are dyed according to the procedure given below. Results are shown in Table II.

Dyeing Procedure

Dispersed "Terasil" dyestuffs are applied to polypropylene face yarns from aqueous dye liquors containing a dispersing agent such as non-ionic type, Dispersol VL. The dispersion is prepared by stirring the powder brand of dyestuff into 10 to 20 times its own weight of cold water with continuous stirring. This fine dispersion is sieved into the dyebath with one part of Dispersol VL to 1,000 ppm of dye liquor. Polypropylene yarns are put into the dyebath at approximately 40° C. (105° F.) and heated to 85° C. (185° F.) and maintained for a period of ¾ hour. All steps are carried out using a 1:1 liquor-to-goods ratio.

The dyed specimens are measured for color using a Gardner XL-100S instrument manufactured by Pacific Scientific Instruments, 2431 Linden Lane, Silver Spring, Md. 20910 USA. This instrument provides a readout of several color scale definitions, including: X, Y, Z primaries used to define all colors in the color space according to 1931 Commission Internationale de l'Eclairage ("CIE") Color System (relating tristimulus values to wavelength). The amount of each of these primaries (tristimulus values X,Y,Z) in a given color are used to define the shade and depth of shade for that color. The shade of a sample is defined by x and y, and the relative lightness by the Y value which is equivalent to the total reflectance of the dyed textile as observed by the human eye.

(2) L, $a_L$, $b_L$ according to the Hunter System, and others. In the Hunter scale, the scale represents the mathmatical approximation of the non-linear, black-white response of the eye. The relationship between the scale and the CIE system are expressed mathematically as: $L = 10Y^{1/2}$, $a_L = 17.5(1.02X-Y)/Y^{1/2}$, and $b_L = 7.0(Y-0.8467Z)/Y^{1/2}$. If a sample has zero value for "$a_L$" and "$b_L$", it lies somewhere on the "L" black-white axis, and is some shade of gray. A plus value of "$b_L$" indicates yellowness and a minus value blueness. A minus value of "$b_L$" indicates blueness and a minus value yellowness. A plus value of "$a_L$" indicates redness and a minus value greenness. A minus value of "$a_L$" indicates greenness and a minus value redness. "YI" is a yellowness index. In Table II, "a" is "$a_L$" and "b" is "$b_L$".

TABLE I

| Physical Properties | (Unmodified homo-polymer) | Example I (Alloy Modified PP) | Example II (Grafted Modified PP) |
| --- | --- | --- | --- |
| Denier (gms/9000 meters) | 1,450 | 1,480 | 1,460 |
| Tensile (gms/den) | 2.5 | 2.5 | 2.3 |
| Elongation (%) | 39.0 | 44.0 | 48.0 |
| Toughness (gms/den) | 0.69 | 0.75 | 0.80 |
| Energy At Break (gms–inch) | 3,980 | 4,420 | 4,675 |
| Young Modulus (grms/den) | 17.0 | 12.0 | 10.5 |

TABLE II

| Dispersed Dyestuff | Standard PP | | | | Example I | | | | Example II | | | |
| --- | --- | --- | --- | --- | --- | --- | --- | --- | --- | --- | --- | --- |
| Terasil | L | a | b | YI | L | a | b | YI | L | a | b | YI |
| Brown 2RFL | 41.0 | 7.5 | 5.8 | 38.6 | 33.7 | 8.1 | 6.2 | 50.1 | 34.1 | 8.8 | 7.1 | 55.8 |
| Pink 2GLA | 57.2 | 14.6 | −.7 | 16.7 | 45.9 | 19.1 | 2.4 | 39.1 | 51.8 | 23.2 | 4.0 | 46.0 |
| Blue GR | 61.6 | 2.2 | −17.0 | −46.8 | 50.5 | −2.1 | −17.2 | −64.0 | 51.3 | −0.8 | −19.7 | −69.7 |
| Yellow 6G | 82.1 | −13.1 | 35.8 | 66.5 | 80.4 | −13.5 | 41.6 | 80.6 | 80.8 | −13.9 | 42.0 | 80.6 |

It can be seen that a substantially lower "L" value for Example I and Example II, relative to the polypropylene standard, for brown and blue dyes indicate a substantially darker shade was achieved for the product of the present invention. The larger increase in YI value for Examples I and II, relative to the standard, illustrates the improved depth of shade and richness of yellow dye color. The higher positive "b" value of the yellow dye relative to standard indicates a greater intensity of yellow. The more negative "b" value of Example II relative to Example I shows that the grafted composition produces a more blue fiber than the blended composition. The lower "L" value for Example I relative to Example II for pink dye suggests that a blended composition produces a darker pink than a grafted composition but a t a cost of a less red pink as shown by the slightly lower "a" value. These results show that in all instances for each of the several dyes, the specimens knitted with fiber formed as described in Examples 1 and 2 dye deeply and intensely, generally moreso in the knits formed with fiber shaped from the grafted polymer of Example 2. The results on dyeing knits formed with fiber made according to Example 3 is similar to the results obtained in Example 2.

While it is not desired to be bound to any particular theory of why the compositions and methods of our invention are so effective, it is speculated that the mode of attachment of dispersed dyestuff consists of hydrogen bonding of the dyestuff molecule to the carbonyl oxygen of the ester grouping in methyl acrylate. Dispersed dyestuff exhibits excellent retention indicating strong chemical affinity between the functionality in the ester group and dyestuff.

What is claimed is:

1. A process for dyeing fibers based on a polypropylene comprising:
   (a). forming into a fiber a composition of about 98 to 85 percent by weight of a polypropylene and a selected amount of an ethylene copolymer comprising about 70 to 80 percent by weight ethylene and about 30 to 18 percent by weight of an alkyl acrylate wherein the alkyl has one to four carbon atoms, the amount of ethylene copolymer in the composition selected to provide said alkyl acrylate in an amount between 0.2–2.0% by weight and to provide said ethylene in an amount less than 10% by weight of the sum of the polypropylene and ethylene copolymer;
   (b). exposing the fiber to a disperse dye.

2. The process of claim 1 wherein the alkyl acrylate is present in an amount between 0.5%–1.5% by weight.

3. The process of claim 1 wherein the composition is a blend.

4. The process of claim 1 wherein at least a portion of the ethylene copolymer is grafted onto said polypropylene.

5. The process of claim 1 in which the ethylene copolymer is ethylene methyl acrylate.

6. The process of claim 1 in which the ethylene copolymer is ethylene ethyl acrylate.

7. The process of claim 1 in which the ethylene copolymer is ethylene butyl acrylate.

8. The process of claim 4 wherein the composition further includes 1–10% by weight of a polyamide blended therein.

9. The process of claim 1 wherein said composition further includes about 1–10% by weight of a polyamide.

10. A process for dyeing fibers based on polypropylene comprising:
    (a) combining polypropylene with a selected amount of an ethylene copolymer of about 70 to 80 percent by weight ethylene and about 30 to 18 percent by weight of an alkyl acrylate wherein the alkyl group has one to four carbon atoms, to form a composition, said alkyl acrylate comprising less than 2.0% of the composition;
    (b) extruding the composition into fibers;
    (c). exposing the fibers to a disperse dye bath containing a disperse dye.

11. The process of claim 10 wherein the composition is a blend.

12. The process of claim 10 wherein at least a portion of the ethylene copolymer is grafted onto said polypropylene.

13. The process of claim 10 wherein the ethylene alkyl acrylate is ethylene methyl acrylate.

14. The process of claim 13 wherein the composition comprises 0.5%–1.5% methyl acrylate component.

15. A colored polyolefin fiber comprising:
    (a) about 98 to 85 percent by weight of a polypropylene;
    (b) a selected amount of an ethylene copolymer comprising about 70 to 80 percent by weight ethylene and about 30 to 18% by weight of an alkyl acrylate wherein the alkyl acrylate has one to four carbon atoms, sufficient to provide alkyl acrylate in an amount between 0.2%–2.0% by weight, wherein at least a portion of said copolymer is grafted onto said polypropylene; and
    (c) an effective amount of a disperse dye diffused therein sufficient to produce a colored fiber.

16. The fiber of claim 15 in which the ethylene copolymer is ethylene methyl acrylate.

17. The fiber of claim 15 in which the ethylene copolymer is ethylene ethyl acrylate.

18. The fiber of claim 15 in which the ethylene copolymer is ethylene butyl acrylate.

19. The fiber of claim 15 in which said alkyl acrylate is present is an amount 0.5–1.5% by weight.

20. The fiber of claim 19 in which said ethylene copolymer is ethylene methyl acrylate.

21. The fiber of claim 15 further containing 1–10% by weight of a polyamide blended therein.

22. A polyolefin fiber comprising;
    about 98 to 85 percent by weight of a polypropylene; a selected amount of an ethylene copolymer incorporated into the polypropylene to form an alloy said ethylene copolymer comprising about 70 to 85 percent by weight ethylene and about 30 to 18 percent by weight of an alkyl acrylate wherein the alkyl acrylate has one to four carbon atoms, said alkyl acrylate component present in an amount between 0.2–2.0% by weight; and an effective amount of a disperse dye diffused through the alloy sufficient to produce a colored composition.

23. The fiber of claim 22 in which the ethylene copolymer is ethylene methyl acrylate.

24. The fiber of claim 22 in which the ethylene copolymer is ethylene ethyl acrylate.

25. The fiber of claim 22 in which the ethylene copolymer is ethylene butyl acrylate.

26. The fiber of claim 22 in which said alkyl acrylate is present in an amount 0.5%–1.5% by weight.

27. The fiber of claim 26 in which said ethylene copolymer is ethylene methyl acrylate.

28. The fiber of claim 22 wherein the alloy further includes 1–10% by weight of total polymer of a polyamide.

29. The fiber of claim 22 wherein the ethylene copolymer is incorporated into the polypropylene by grafting to produce a grafted alloy.

30. The fiber of claim 22 wherein the ethylene copolymer is incorporated by physical blending with the polypropylene to produce a blended alloy.

31. A colored polypropylene fiber comprising:

(a) about 98 to 85 percent by weight of polypropylene;
(b) a selected amount of an ethylene copolymer incorporated into the polypropylene, the ethylene copolymer comprising about 70 to 80 percent by weight ethylene and about 24 to 18 percent by weight of methyl acrylate, said methyl acrylate present in an amount between 0.2–2.0% by weight;
(c) and an effective amount of a disperse dye diffused into the polypropylene to produce a colored fiber.

32. The colored fiber of claim 31 wherein the methyl acrylate is present in an amount 0.514 1.5% by weight.

33. The colored fiber of claim 31 further containing 1–10% by weight of a polyamide blended therein.

* * * * *